United States Patent [19]
Amatucci

[11] Patent Number: 5,759,720
[45] Date of Patent: Jun. 2, 1998

[54] LITHIUM ALUMINUM MANGANESE OXY-FLUORIDES FOR LI-ION RECHARGEABLE BATTERY ELECTRODES

[75] Inventor: Glenn G. Amatucci, Raritan, N.J.

[73] Assignee: Bell Communications Research, Inc., Morristown, N.J.

[21] Appl. No.: 868,553

[22] Filed: Jun. 4, 1997

[51] Int. Cl.$^6$ .............................. H01M 4/40; H01M 4/50
[52] U.S. Cl. .............. 429/224; 429/218; 423/464; 423/594
[58] Field of Search ............................ 429/218, 224; 423/464, 594, 600

[56] References Cited

U.S. PATENT DOCUMENTS

| | | | |
|---|---|---|---|
| 4,462,889 | 7/1984 | Landon et al. | 204/292 |
| 4,514,518 | 4/1985 | Henslee et al. | 502/229 |
| 5,084,366 | 1/1992 | Toyoguchi | 429/224 |
| 5,169,736 | 12/1992 | Bittihn et al. | 429/194 |
| 5,425,932 | 6/1995 | Tarsacon | 423/599 |
| 5,631,105 | 5/1997 | Hasegawa et al. | 429/194 |
| 5,674,645 | 10/1997 | Amatucci et al. | 429/224 |

OTHER PUBLICATIONS

Lithium intercalation in Li-Mg-Mn-O and Li-Al-Mn-O spinels; Le Cras et al., Solid State Ionics, 89 (1996), pp. 203-213 (no month available).

*Primary Examiner*—Prince Willis, Jr.
*Assistant Examiner*—Carol Chaney
*Attorney, Agent, or Firm*—Joseph Giordano; Loria B. Yeadon; David A. Hey

[57] ABSTRACT

The cycling stability and capacity of Li-ion rechargeable batteries are improved, particularly in an elevated temperature range of about 55° C., by the use of lithium aluminum manganese oxy-fluoride electrode components having the general formula, $Li_{1+x}Al_yMn_{2-x-y}O_{4-z}F_z$, where $x \leq 0.4$, $0.1 \leq y \leq 0.3$, and $0.05 \leq z \leq 0.5$.

6 Claims, 2 Drawing Sheets

5,759,720

LITHIUM ALUMINUM MANGANESE OXYFLUORIDES FOR LI-ION RECHARGEABLE BATTERY ELECTRODES

BACKGROUND OF THE INVENTION

The present invention relates to lithium manganese oxide intercalation compounds useful as active electrode materials in Li-ion rechargeable batteries and, particularly, to oxy-fluoride complexes of aluminum-substituted manganese oxides and their use to improve the cycling stability and capacity of such batteries.

Lithium manganese oxide intercalation compounds, nominally $LiMn_2O_4$, have been increasingly proven to be effective and economical materials for the fabrication of secondary, rechargeable Li-ion electrolytic cells and composite batteries. Successful batteries of this type are described in U.S. Pat. Nos. 5,296,318 and 5,460,904. These batteries exhibit an admirable level of electrical storage capacity and recharge cycling stability over a wide range of voltages; however, these properties have not been considered entirely satisfactory to meet the increasingly stringent requirements of modern electronic equipment and applications.

Extensive investigations have been undertaken to improve the noted properties, and such works have resulted in determinations that variations in the structural parameters of the $LiMn_2O_4$ spinel, for example, the a-axis lattice dimension of the compound, contribute significantly to ultimate cell performance. Such structural parameters have in turn been found to depend to a great extent upon the constitution of the intercalation compound and upon the conditions of its synthesis. Recently, in U.S. Ser. No. 08/706, 546, filed 6 Sep. 1996, now U.S. Pat. No. 5,674,645, incorporated herein by reference, Amatucci at el. achieved extraordinary improvement in capacity capabilities and cycling stability through the anionic fluorine substitution of lithium manganese oxide intercalation electrode compounds, including such compounds in which the manganese oxides were cationically-substituted in part with transition metal ions.

Investigations into other cationic substitutions in the basic $LiMn_2O_4$ structure for the purpose improving capacity and cycling characteristics have been reported by Le Cras et al., Solid State Ionics, 89 (1996), pp. 203–213. Although the substitution of a portion of manganese with lighter aluminum effected a distinct improvement in the theoretical capacity of resulting electrolytic cells, actual cell performance, particularly in capacity stability over extended cycling, was less than encouraging.

SUMMARY OF THE INVENTION

In the investigations underlying the present invention, it has been found that the anionic substitution with fluorine in lithium manganese oxide cell electrode intercalation materials is effective in improving the performance not only of materials obtained with the basic-structured $LiMn_2O_4$ and its transition metal-substituted complexes, but also materials derived from cationic aluminum substitution for manganese in the spinel, particularly with respect to high-temperature cycling stability.

Intercalation materials that may be effectively employed in the present invention to achieve the noted improvements over prior electrolytic cells are represented in the general formula, $Li_{1+x}Al_yMn_{2-x-y}O_{4-z}F_z$, where $x \leq 0.4$, $0.1 \leq y \leq 0.3$, and $0.05 \leq z \leq 0.5$. Preparation of these advantageous aluminum-substituted oxy-fluoride spinel derivatives may most simply follow the usual practice, such as noted in Tarascon, U.S. Pat. No. 5,425,932 and earlier-mentioned Amatucci et al., of annealing at about 800° C. stoichiometric mixtures of appropriate precursor compounds, typically $Al_2O_3$, $Li_2CO_3$, LiF, and $MnO_2$.

Series of oxy-fluoride compounds varying primarily in y and z formula components, i.e., Al and F, were examined by x-ray diffraction analysis to determine the resulting a-axis lattice parameters and were used to prepare battery cell positive electrode compositions which were then incorporated into test cells in the usual manner, as described in the incorporated disclosure of Amatucci et al. The cells were subjected to repeated charge/discharge cycling to determine the effect of compound constitution on the level of electrical storage capacity exhibited by the cells, generally as mAhr/g of electrode compound, as well as on cycling stability, i.e., the ability to maintain the initial level of capacity over extended cycling, not only at room temperature, but on into a high-stress temperature range up to about 55°C.

BRIEF DESCRIPTION OF THE DRAWING

The present invention will be described with reference to the accompanying drawing of which.

DESCRIPTION OF THE INVENTION

In accordance with the following examples, intercalation materials of the present invention, as well as comparative samples of prior Al-substituted and unsubstituted compounds, were prepared in the manner described in the aforementioned U.S. Pat. No. 5,425,932, using stoichiometric mixtures of the primary precursor compounds, and were tested as active components of positive secondary cell electrodes. For example, a $Li_{1+x}Mn_2O_4$ spinel employed in prior practices (according to present formula designation, $Li_{1+x}Al_yMn_{2-x-y}O_{4-z}F_z$, where $y=0$ and $z=0$) was prepared for use as a performance control by annealing 9.70 parts by weight of $Li_2CO_3$ and 42.38 parts of $MnO_2$ to obtain an optimally preferred $Li_{1.05}Mn_{1.95}O_4$ compound. Test cells of the samples were prepared and tested in galvanostatic and potentiostatic studies, generally as described in that patent specification. Such test cells comprised lithium foil negative electrodes as a practical expedient, since experience has confirmed that performance results achieved in this manner are objectively comparable to those obtained with Li-ion cell compositions described in the other above-noted patent specifications.

EXAMPLE 1

In a typical preparation of an intercalation material of the present invention, stoichiometric proportions of the precursors, $MnO_2$ (EMD-type), $Li_2CO_3$, $Al_2O_3$, and LiF, were thoroughly mixed in an agate mortar and pestle in a weight ratio of 31.83:5.69:0.98:1, and the mixture was annealed in air in an alumina crucible in the manner of the control sample to obtain a test composition of $Li_{1+x}Al_y Mn_{2-x-y}O_{4-z}F_z$, where $x=0$, $y=0.1$, and $z=0.2$ ($Li_{1.0}Al_{0.1}Mn_{1.9}O_{3.8}F_{0.2}$) Specifically, the mixture was heated at a regular rate over a period of about 12 hours to a temperature of 790° C. at which it was maintained for about 12 hours. The sample was then cooled to room temperature at a regular rate over a period of about 24 hours. After a mix/grinding, the sample was reheated over a period of 5 hours to 790° C. where it was held for about 12 hours before being finally cooled to room temperature over a period of about 24 hours. The resulting aluminum manganese oxyfluoride compound was characterized by CuKα x-ray diffraction (XRD) examination which showed clearly-defined peaks confirming a well-crystallized, single-phase product of the synthesis.

EXAMPLE 2

A series of aluminum manganese oxy-fluoride compounds of the present invention, plus a non-fluorinated control according to Le Cras et al., was prepared in the foregoing manner with appropriate combinations of precursor compounds to yield spinels of the formula $Li_{1+x}Al_y Mn_{2-x-y}O_{4-z}F_z$, where $x=0$, $y=0.1$, and $z=0$, 0.20, 0.30, and 0.40. The resulting samples were characterized by XRD from which the respective a-axis lattice parameters were calculated.

EXAMPLE 3

Figure 1:
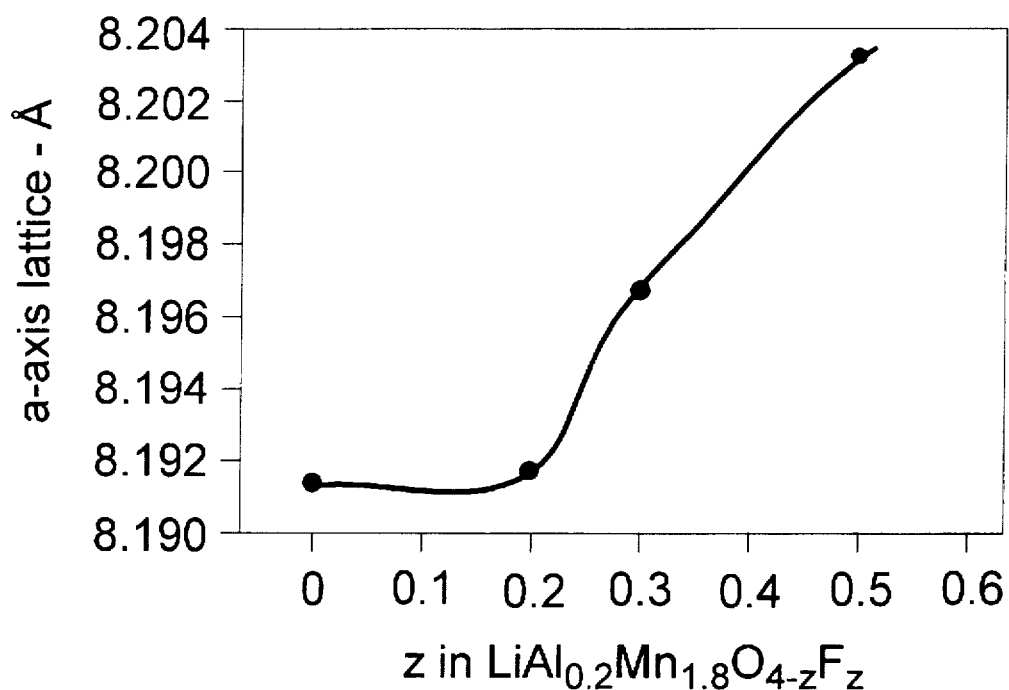
FIG. 1 is a graph of a-axis lattice dimensions v. z of invention compounds, $Li_{1+x}Al_yMn_{2-x-y}O_{4-z}F_z$, where $x=0$, $y=0.2$, and $z \leq 0.5$.

A second series of samples of variant composition was similarly prepared with appropriate combinations of precursor compounds to yield spinels of the formula $Li_{1+x}Al_y Mn_{2-x-y}O_{4-z}F_z$ where $x=0$, $y=0.2$, and $z=0$, 0.20, 0.30, and 0.50. The resulting samples were characterized by XRD from which the respective a-axis lattice parameters were likewise calculated. A plot of these latter parameter dimensions as shown in FIG. 1 indicates the regular increase which tracks and is indicative of the increase in fluorine substitution. Throughout the indicated levels of variants, however, the materials of the invention exhibit a-axis dimensions well within the desirable range of less than about 8.23 Å.

EXAMPLE 4

Figure 2:
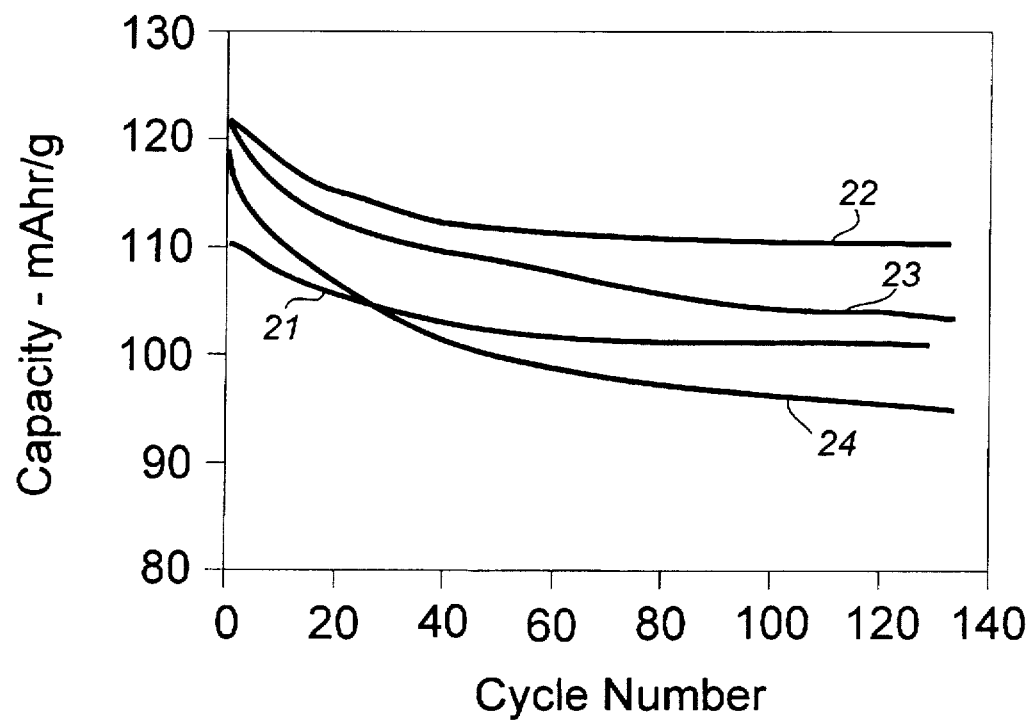
FIG. 2 is a graphic comparison of capacity and room temperature cycling stability v. number of charging cycles for cells comprising a prior $Li_{1+x}Al_yMn_{2-x-y}O_4$ electrode compound and $Li_{1+x}Al_yMn_{2-x-y}O_{4-z}F_z$ compounds of the present invention, where $x=0$, $y=0.1$, and $z \leq 0.4$.

Portions of the samples of $Li_{1.0}Al_{0.1}Mn_{1.9}O_{4-z}F_z$, where z varies at 0, 0.2, 0.3, and 0.4, prepared in Example 2 were individually incorporated with about 10% conductive carbon and 5% polyvinylidene fluoride binder and cast from a solvent vehicle on an aluminum foil substrate to provide upon drying, preferably in a nitrogen atmosphere, positive test cell electrodes. Arranged in the usual manner with a lithium foil electrode and intervening glass fiber separator saturated with a 1M electrolyte solution of $LiPF_6$ in a 2:1 mixture of ethylene carbonate:dimethylcarbonate, the sample electrodes formed test cells which were subjected to room temperature charge/discharge cycling over the range of 3.4–4.5 V at a C/5 rate (full cycle over 5 hours). The capacity of each cell was traced during a period in excess of about 130 cycles to provide an indication, as seen in FIG. 2, of the extent of change of that property, i.e., the cycling stability of the cell, with protracted recharging. Traces 21–24 reflect the results from the above-noted increasing levels of fluorine substitution, z, from 0 to 0.4.

EXAMPLE 5

Figure 3:
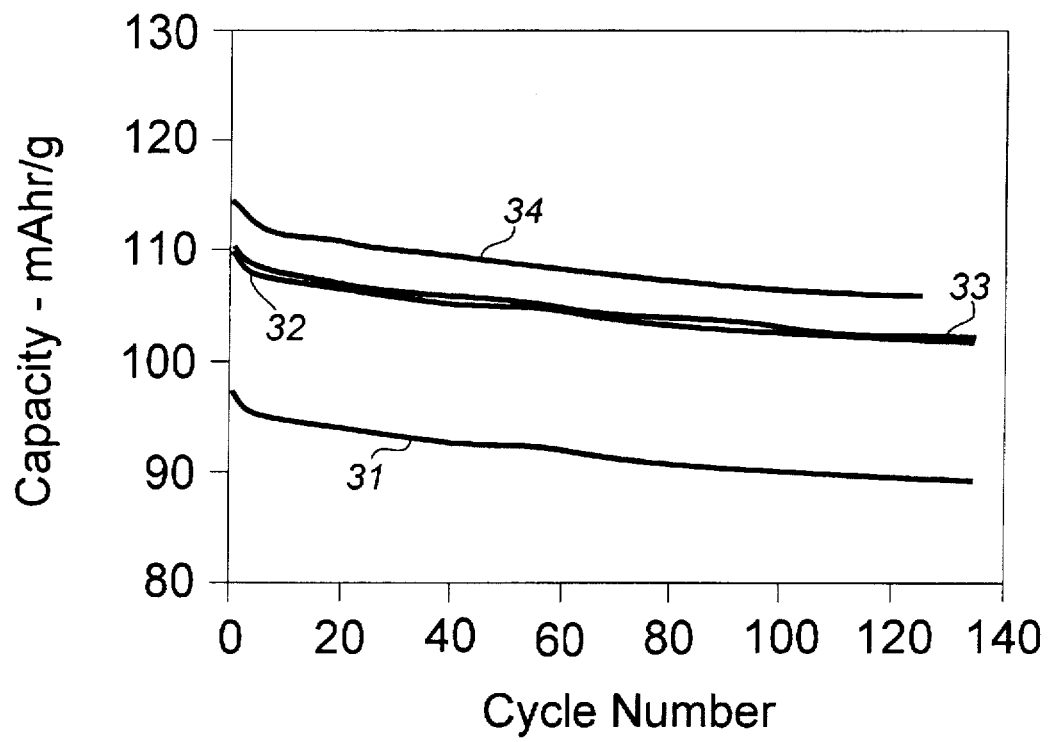
FIG. 3 is a graphic comparison of capacity and room temperature cycling stability v. number of charging cycles for cells comprising a prior $Li_{1+x}Al_yMn_{2-x-y}O_4$ electrode compound and $Li_{1+x}Al_yMn_{2-x-y}O_{4-z}F_z$ compounds of the present invention, where $x=0$, $y=0.2$, and $z \leq 0.5$.

Portions of the samples of $Li_{1.0}Al_{0.2}Mn_{1.8}O_{4-z}F_z$, where z varies at 0, 0.2, 0.3, 0.5, prepared in Example 3 were similarly incorporated into test cells and subjected to extended cycling. As seen from the traced capacities in FIG. 3, the capacity levels of the increasingly fluoro-substituted samples 32–34 of these more greatly Al-substituted materials consistently exceeded that of non-fluorinated control sample 31.

EXAMPLE 6

Figure 4:
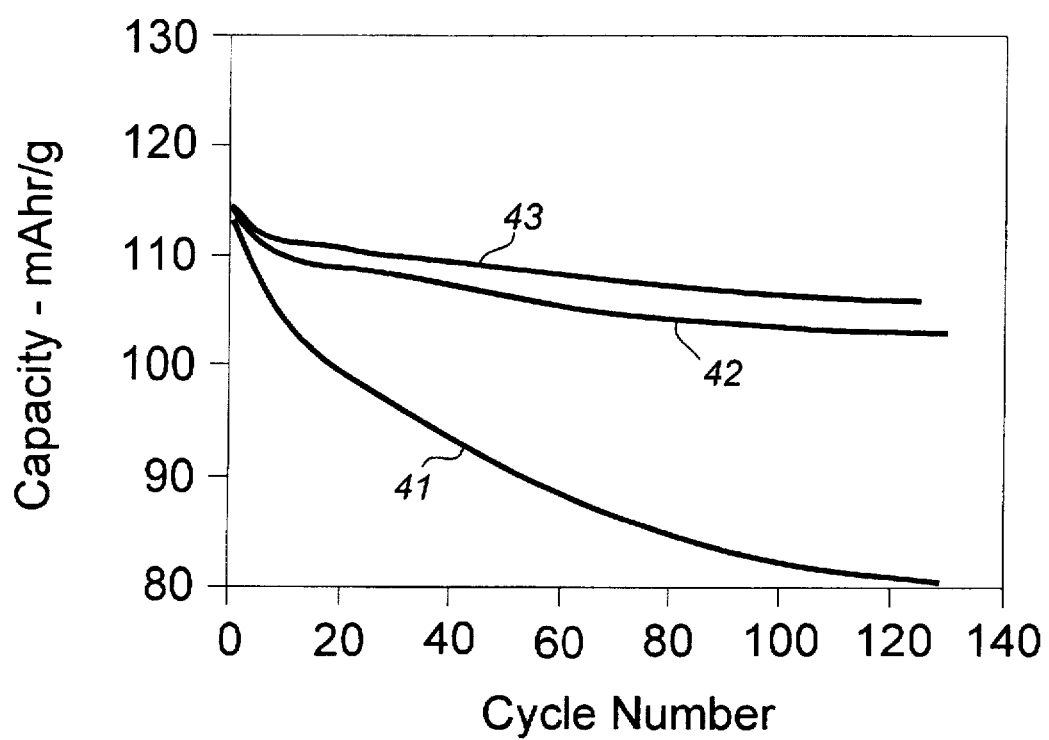
FIG. 4 is a graphic comparison of capacity and room and elevated temperature cycling stability v. number of charging cycles for cells comprising a prior $Li_{1.05}Mn_{1.95}O_4$ electrode compound and $Li_{1+x}Al_yMn_{2-x-y}O_{4-z}F_z$ compounds of the present invention, where $x=0$, $y=0.2$, and $z=0.5$.

In order to determine the particular efficacy of the present invention materials in improving cell capacity and stability over an extended range of operating temperatures, test cells respectively comprising a preferred $Li_{1.05}Mn_{1.95}O_4$ compound used in prior cells and the $Li_{1.0}Al_{0.2}Mn_{1.8}O_{3.5}F_{0.5}$ electrode material of Example 4 were subjected to extended cycling at about 55° C., a temperature at which noticeable degradation of cell performance is commonly observed. Results of these tests appear, respectively, in FIG. 4 as traces 41 and 42, along with the earlier-depicted room temperature trace 43 of the same invention material. As is apparent, the present invention material maintains a higher degree of both capacity and cycling stability over the broad range of temperatures normally experienced in rechargeable battery usage.

It is expected that other embodiments of the present invention will become apparent to the skilled artisan in light of the foregoing description, and such variations are intended to be included within the scope of this invention as recited in the appended claims.

What is claimed is:

1. A lithium aluminum manganese oxy-fluoride compound having the formula, $Li_{1+x}Al_y Mn_{2-x-y}O_{4-z}F_z$, where $x \leq 0.4$, $0.1 \leq y \leq 0.3$, and $0.05 \leq z \leq 0.5$.

2. A compound according to claim 1 where $x \leq 0.2$, $y=0.1$, and $0.2 \leq z \leq 0.4$.

3. A compound according to claim 1 where $x \leq 0.2$, $y=0.2$, and $0.2 \leq z \leq 0.5$.

4. A rechargeable battery cell comprising a positive electrode, a negative electrode, and a separator disposed therebetween characterized in that said positive electrode comprises an intercalation compound having the general formula, $Li_{1+x}Al_y Mn_{2-x-y}O_{4-z}F_z$, where $x \leq 0.4$, $0.1 \leq y \leq 0.3$, and $0.05 \leq z \leq 0.5$.

5. A rechargeable battery cell according to claim 4 where $x \leq 0.2$, $y=0.1$, and $0.2 \leq z \leq 0.4$.

6. A rechargeable battery cell according to claim 4 where $x \leq 0.2$, $y=0.2$, and $0.2 \leq z \leq 0.5$.

* * * * *